US008029749B2

(12) United States Patent
Caro et al.

(10) Patent No.: US 8,029,749 B2

(45) Date of Patent: *Oct. 4, 2011

(54) CRACKING FURNACE

(75) Inventors: Colin G. Caro, London (GB); Philip L. Birch, Chiddingfold (GB); William Tallis, Warwickshire (GB)

(73) Assignee: Technip France S.A.S., Courbevoie (FR)

( * ) Notice: Subject to any disclaimer, the term of this patent is extended or adjusted under 35 U.S.C. 154(b) by 233 days.

This patent is subject to a terminal disclaimer.

(21) Appl. No.: 12/234,352

(22) Filed: Sep. 19, 2008

(65) Prior Publication Data

US 2009/0095594 A1 Apr. 16, 2009

Related U.S. Application Data

(63) Continuation-in-part of application No. 11/686,735, filed on Mar. 15, 2007, now Pat. No. 7,749,462, which is a continuation-in-part of application No. PCT/GB2005/003632, filed on Sep. 21, 2005, and a continuation of application No. PCT/GB2007/000849, filed on Mar. 12, 2007.

(60) Provisional application No. 60/782,398, filed on Mar. 15, 2006.

(30) Foreign Application Priority Data

Sep. 21, 2004 (GB) .................................. 0420971.4
Mar. 10, 2006 (GB) .................................. 0604895.3

(51) Int. Cl.
*B01J 8/00* (2006.01)
*B01J 19/00* (2006.01)

(52) U.S. Cl. ......... 422/659; 422/655; 422/198; 422/200

(58) Field of Classification Search .................. 422/198, 422/200, 204, 196, 193, 655, 659
See application file for complete search history.

(56) References Cited

U.S. PATENT DOCUMENTS

| | | | |
|---|---|---|---|
| 85,149 | A | 12/1808 | Van Amringe |
| D16,763 | S | 3/1857 | Watson |
| 892,919 | A | 7/1908 | Wedgefuth |
| 1,363,416 | A | 12/1920 | Hooker |
| 1,818,082 | A | 8/1931 | Mott |
| 1,913,417 | A | 6/1933 | Ulrich |
| 2,115,769 | A | 5/1938 | Harris |
| 2,246,418 | A | 6/1941 | Ward |

(Continued)

FOREIGN PATENT DOCUMENTS

AU 77718/75 8/1976

(Continued)

OTHER PUBLICATIONS

Caro et al., "A Novel Approach to Ethylene Furnace Coil Design," 18th Annual Ethylene Producers' Conference, 13 pages (Apr. 23-27, 2006).

(Continued)

*Primary Examiner* — Walter D Griffin
*Assistant Examiner* — Lessanework Seifu
(74) *Attorney, Agent, or Firm* — Marshall, Gerstein & Borun LLP

(57) ABSTRACT

The invention relates to piping for use as a pyrolysis tube in a cracking furnace. The tube is formed such that it has at least one section whose centerline curves in three dimensions, to induce swirl flow in the tube. Preferably, the tube is formed as a helix.

7 Claims, 8 Drawing Sheets

U.S. PATENT DOCUMENTS 2,613,993 A 10/1952 Holden
2,663,321 A 12/1953 Jantsch
2,832,374 A 4/1958 November
RE24,783 E 2/1960 Humphrey
3,117,821 A 1/1964 Mylting
3,188,586 A 6/1965 Martin et al.
3,201,723 A 8/1965 Martin et al.
3,227,525 A 1/1966 Degeorges et al.
3,345,590 A 10/1967 Wolfgang et al.
3,578,075 A 5/1971 Winter
3,606,780 A 9/1971 Nagahara
3,610,289 A 10/1971 Moss et al.
3,612,175 A 10/1971 Ford et al.
3,647,187 A 3/1972 Dannewitz et al.
3,713,784 A 1/1973 Pohl et al.
3,719,207 A 3/1973 Takeda
3,779,312 A 12/1973 Withers, Jr. et al.
4,061,562 A 12/1977 McKinney et al.
4,317,353 A 3/1982 Geppelt et al.
T103,901 I4 2/1984 Lupke
4,595,058 A 6/1986 Nations
4,827,074 A 5/1989 Suwa et al.
4,995,450 A 2/1991 Geppelt et al.
5,167,483 A 12/1992 Gardiner
5,383,100 A 1/1995 Kikos
5,553,976 A 9/1996 Korsgaard
5,711,744 A 1/1998 Strawcutter et al.
5,799,623 A 9/1998 Born et al.
6,039,754 A 3/2000 Caro
6,343,516 B1 2/2002 Marrelli
6,399,031 B1 6/2002 Herrmann et al.
6,419,885 B1 7/2002 Di Nicolantonio et al.
6,481,492 B1 11/2002 Zhu et al.
6,719,953 B2 4/2004 Di Nicolantonio et al.
6,776,194 B2 8/2004 Houston et al.
6,896,007 B2 5/2005 Cymbalisty
6,997,214 B2 2/2006 Kuo
7,114,524 B2 10/2006 Houston et al.
7,749,462 B2 7/2010 Caro et al.
2002/0043022 A1 4/2002 Warren
2002/0179166 A1 12/2002 Houston et al.
2002/0179494 A1 12/2002 Doerksen
2004/0000350 A1 1/2004 Cymbalisty
2004/0134557 A1 7/2004 Cymbalisty
2005/0131263 A1 6/2005 Wolpert et al.
2006/0102327 A1 5/2006 Inui et al.
2006/0137864 A1 6/2006 Jakobi et al.
2007/0021707 A1 1/2007 Caro et al.
2007/0156078 A1 7/2007 Caro et al.
2008/0030023 A1 2/2008 Kurata et al.
2008/0262599 A1 10/2008 Caro et al.

FOREIGN PATENT DOCUMENTS

CA 1 119 853 A1 3/1982
DE 100 42 768 3/2002
EP 0 305 799 3/1989
EP 0 712 711 5/1996
EP 1 127 557 8/2001
EP 1 396 291 A1 3/2004
FR 2 248 015 5/1975
GB 0 499 058 1/1939
GB 0 729 618 5/1955
GB 969796 9/1964
GB 2 192 966 1/1988
JP 57-027740 2/1982
JP 09-248445 A 9/1997
JP 2002-533157 T 10/2002
KR 1994-769 B1 4/1998
RU 2 110 554 5/1998
SU 531 993 10/1976
WO WO-86/04951 8/1986
WO WO-92/11931 7/1992
WO WO-95/09585 4/1995
WO WO-97/28232 8/1997
WO WO-97/28637 8/1997
WO WO-98/53764 2/1998
WO WO-98/56872 12/1998
WO WO-00/38591 7/2000
WO WO-01/18406 A1 3/2001
WO WO-02/47576 6/2002
WO WO-02/070626 9/2002
WO WO-02/093063 11/2002
WO WO-02/093064 11/2002
WO WO-02/098325 12/2002
WO WO-03/069209 8/2003
WO WO-2004/015237 A2 2/2004
WO WO-2004/083705 A1 9/2004
WO WO-2004/083706 A1 9/2004
WO WO-2005/075607 8/2005
WO WO-2006/018251 2/2006
WO WO-2006/032877 3/2006
WO WO-2007/104952 A2 9/2007

OTHER PUBLICATIONS

Caro et al., "A Novel Approach to Ethylene Furnace Coil Design," Presentation at the 18th Annual Ethylene Producers' Conference, 19 pages (Presented on Apr. 26, 2006).

International Search Report for International Application No. PCT/GB2005/003632, dated Dec. 5, 2005.

Written Opinion for International Application No. PCT/GB2005/003632, dated Dec. 5, 2005.

European Search Report for Application No. 09 00 5580, dated May 13, 2009.

European Search Report for Application No. 09 00 1322, dated Jul. 3, 2009.

Written Opinion for Application No. PCT/GB04/001163, dated Jun. 23, 2004.

Canadian Office Action for Application No. 2,519,011, dated Jul. 9, 2010.

English-language translation of Japanese Office Action for Application No. 2006-505985, dated Feb. 4, 2010.

European Search Report fo Application No. 07024102, dated Apr. 24, 2008.

International Search Report for International Application No. PCT/GB2004/001663, dated Jun. 23, 2004.

International Search Report for International Application No. PCT/GB2007/000849, dated Jan. 23, 2008.

Matteo, "Mechanistic modeling of slug dissipation in helical pipes," Thesis submitted to the University of Tulsa Graduate School, Petroleum Engineering (2003).

Ramirez, "Slug dissipation in helical pipes," Thesis submitted to the University of Tulsa Graduate School, Mechanical Engineering (2000).

Written Opinion for Application No. PCT/GB2004/001170, dated Jun. 21, 2004.

CRACKING FURNACE

The present invention relates to pyrolysis tubing for use in cracking furnaces.

Cracking furnaces are used in particular in the production of ethylene. In the steam cracking process for ethylene, a hydrocarbon feedstock is diluted with steam, and then heated rapidly to a high temperature by passing it through tubes (usually referred to as "furnace coils") in a furnace. The high temperature decomposes the hydrocarbon feedstock. The output stream, containing a broad mixture of hydrocarbons from the pyrolysis reactions in the pyrolysis tubes plus unreacted components of feedstock, is then quenched to prevent recombination of the products. The cooled stream can then be processed through a series of distillation and other separation operations in which the various products of the cracking operation are separated.

Known cracking furnaces suffer from a number of problems. Because of the very low residence time of the feedstock and steam flowing through the tubes in the furnace (a few tenths of a second), the furnace and the tubes must be maintained at a very high temperature in order to achieve the necessary rapid heating to achieve pyrolysis. A large amount of fuel is thus required to fire the furnace.

Further, the very high temperature of the tubes in the furnace leads to the deposition of coke on the inside of the tubes. This coking is particularly unwelcome, as the presence of a layer of coke on the inside of the tube reduces heat transfer from the furnace to the feedstock, and so affects yield. It also increases the pressure drop in the pyrolysis tube, which also reduces yield.

If coke deposition is sufficiently severe, it is normally necessary to take a furnace out of service periodically (typically every 20 to 60 days) to allow decoking of the tubes (such as by steam cleaning). Since each furnace represents a very large capital investment, it is desirable to keep such downtime to a minimum.

In U.S. Pat. No. 6,481,492 there is a proposed design of pyrolysis tube consisting of a tube of circular cross-section divided into two flow passages by a twisted baffle. The intention is to promote lateral movement of process gases in the tube, reducing the thickness of the boundary layer at the wall of each passage, so promoting the efficiency of the heat transfer between the furnace outside the tube and the gases in the flow passages. The aim is to lower the temperature of the inner surfaces of the tube and reduce coking.

However, the use of a twisted baffle in the proposed manner results in the overall cross-section of the tube being divided into two passages each with a semi-circular cross-section. This baffle creates a resistance to the process gases, reducing their flow speed through the furnace and increasing the pressure drop. The use of semi-circular flow passages is thus not optimal. The problem of increased flow resistance is acknowledged in the document, for example at column 7 lines 30-32. It is proposed to deal with the problem by providing a twisted baffle at only certain places in the furnace tube. However, in such arrangements gas which is initially flowing along a single passage of circular cross-section encounters the front end of a baffle, which itself provides an obstruction to the flow and a potential opportunity for fouling or coke deposition. Moreover, because of the high Reynolds numbers which are involved in pyrolysis furnace flows, normal flow will reassert itself within a few tube diameters of the downstream end of a twisted baffle, so requiring several sections of baffled tube for the overall passage of a tube through the furnace, each one creating an obstruction to flow at the upstream end and a resistance to flow.

A much older proposal for the design of a pyrolysis tube in a cracker furnace was made in AU 77718/75. In this proposal it was considered that the yield of ethylene from the cracking processes could be increased by providing a pyrolysis tube which extends through the furnace in a convoluted manner. Helical, double helical, spiral, zig-zag and wavy convolutions were proposed. It was suggested that it is desirable to maximise the surface area to volume ratio of the tube so as to facilitate the necessary heat transfer to the process gas, and that the maximum ratio is achieved by minimising the tube diameter within practical limitations. This pointed to using a smaller diameter tube with a longer streamwise length, i.e. more convoluted, which would then have a larger tube surface area to tube volume ratio than a wider diameter tube which is straight. In keeping with this aim, the embodiment of AU 77718/75 shown in the drawing has a pyrolysis tube with a large helical amplitude compared to the diameter of the tube (at least twice the internal diameter of the tube insofar as this can be determined from the drawing) and a high helix angle (about 70°-80°). However, the longer length and smaller tube diameter required by such a design would lead to a higher pressure drop and be detrimental to yield.

According to the invention, there is provided a cracking furnace with at least one pyrolysis tube passing through the furnace, the pyrolysis tube defining a flow passage with a cross-section which is substantially circular, wherein the pyrolysis tube is formed such that the flow passage of substantially circular cross-section has at least one portion whose centreline curves in three dimensions so as to be helical, and wherein the amplitude of the helical centreline is less than or equal to the internal diameter of the tube portion.

In this specification the amplitude of the helix refers to the extent of displacement from a mean position to a lateral extreme. So, in the case of the pyrolysis tubing portion having a helical centreline, the amplitude is one half of the full lateral width of the helical centreline.

It has been found that when process gases flow through a portion of pipe according to the first aspect of the invention, the gases "swirl" along the pipe (i.e. a component of the motion is around the centreline of the pipe). This "swirl flow" has a number of advantages over conventional flow. One such advantage is that there is improved mixing over the cross-section of the pipe.

When using a pyrolysis tube which has a substantially circular cross-section, and a helical amplitude which is less than or equal to the internal diameter of the tube, the desired improved mixing effect can be obtained without a relatively high pressure drop between the inlet and outlet to the furnace, as compared to the pressure drop which would be expected in the prior art proposals involving a twisted baffle or a high amplitude helix. The inventors have recognised that the benefits of swirl flow, such as to improve mixing, can according to their invention be obtained without large pressure drops.

Pyrolysis tubes traditionally have a circular cross-section. When a circular cross-section tube is modified to have a portion with a helical centreline, the cross-section of the flow passage will be circular if measured perpendicularly to the helical centreline, or elliptical if measured perpendicularly to the central longitudinal axis of an envelope containing the helical tube portion. The reference to a substantially circular cross-section of the flow passage of the invention is intended to mean the shape when measured perpendicularly to the helical centreline. Small variations from exact circularity are within the scope of the invention, particularly in view of the possibility that such variations may arise during the process of manufacturing the pyrolysis tube. The provision of a flow passage of substantially circular cross-section gives an ideal (or close to ideal) shape with a view to minimising flow resistance and hence pressure drop, particularly when compared to the known semi-circular flow passages.

Pyrolysis reactions involve breaking up large hydrocarbon molecules into smaller molecules. Thus the reactions involve the production of more than one molecule of product for each molecule of feedstock, so that a lower pressure drop in the reactor which can be achieved through the use of a helical tube portion according to the invention (compared to the proposals of U.S. Pat. No. 6,481,492 or AU 77718/75) provides a benefit from the lower average pressure, because it will reduce the possibility of the product molecules recombining to form the feedstock or other unwanted by-products. In other words, if a lower pressure drop can be achieved, then the average pressure of the process gases in the pyrolysis tube of the furnace can be less, minimising the opportunity for back reaction. Moreover, the pyrolysis process involves the use of water vapour as a diluent, and by using a pyrolysis tube portion having a helical centreline in accordance with the invention the product molecules are kept well mixed with the water molecules, again minimising the contact of the product molecules with each other and so tending to reduce back reaction.

In addition, as a result of this mixing, the velocity profile of the flow across the pipe is more uniform (or blunter) than it would be with flow in a conventional pipe, with the swirling fluid tending to act as a plunger, scouring the pipe walls. Further, the flow velocity near the wall of the pipe is increased in comparison to a straight pipe, giving a reduced boundary layer thickness which in itself improves heat transfer from the tube walls to the fluid within the pipe.

The improved mixing is of particular relevance when applied to a pyrolysis tube in a furnace, as it provides considerable mass, momentum and heat transfer in fluid within the core of the flow, and between fluid at the walls of the tube and fluid within the core. Thus, there is improved heat transfer from the wall of the pyrolysis tube to the feedstock flowing therein. This improved heat transfer allows greater yields of end-product to be achieved, or would allow the same yields to be achieved for less furnace fuel consumption and at lower tube metal temperatures. This improved heat transfer also effectively increases the capacity of the furnace in circumstances where, as is frequently the case, heat transfer is the limiting factor on the capacity of the furnace. Further, the lower tube metal temperatures are a benefit in prolonging the life of the pyrolysis tube which has to be replaced typically after five years.

Further, swirl flow can reduce coking. The improved heat transfer mentioned above allows the pyrolysis reaction to be carried out with a lower pyrolysis tube wall temperature, and this reduced temperature will lead to reduced coking. In addition, the higher near-wall flow velocity reduces the chance of any coke being deposited (as the coke is more likely to be swept along by the swirl flow), and will also tend to remove any coke which has been deposited on the wall of the tube. As a decrease in coke deposition will increase the length of time for which the furnace can be used before requiring decoking, and thus increase the productivity of the furnace, the use of swirl flow in the pyrolysis tube can be extremely significant.

Preferably, the inside surface of the pyrolysis tube is substantially smooth, and may for example be coated with a low friction coating, such coatings being known as such. It is preferred to avoid surface features such as rifling, as this would lead to an increased length of the "wetted" perimeter and a consequent tendency for there to be increased flow resistance. It is known for conventional pyrolysis tubes (straight or curved in two dimensions only) to be provided with rifling and this can promote a swirl flow near to the inside surface of the tube. However, this is a relatively localised, near wall effect, which leaves a flow at the core where there is very little if any cross-mixing. Therefore, the improved heat transfer benefit of the present invention is not obtained. In a straight or two-dimensionally curved rifled tube the centreline is correspondingly straight or follows the two-dimensional curve.

In a preferred form, the pyrolysis tube is formed such that it has at least one portion whose centreline is formed as a helix with plural turns. If the centreline of the tube is formed as a helix (which curves in three dimensions) with plural turns, then swirl flow will continue along the tube, and the advantages will continue to be obtained.

Swirl flow is quickly established in a tube section whose centreline curves in three dimensions. The benefits of swirl flow discussed above may in certain circumstances be achieved by a pyrolysis tube portion the centreline of which curves in three dimensions over a short distance. However, if the tube then reverts to a normal section with a straight centreline, the swirl flow will die away and be replaced with normal flow. In certain preferred embodiments, therefore, the majority of the pyrolysis tube as it passes through the furnace has a centreline curving in three dimensions. For example, more than 20 or 30 or 40 or 50 or 75 or 90 percent, of the extent of the tube within the furnace may have a 3-D curved centreline. In some preferred embodiments, between 30 and 60 percent, or 30 and 50 percent, or 30 and 40 percent, or 40 and 60 percent, or 40 and 50 percent, or 50 and 60 percent, of the extent of the tube within the furnace has a 3-D curved centreline.

The pyrolysis tube portion may be formed such that its helix angle is constant, and this may be desirable from the point of view of simplifying manufacture of the pyrolysis tube.

However, it is also possible for the curvature to vary along the length of the pyrolysis tube portion. For example, the tube portion may have a plurality of parts, each part having a different helical curvature. A variable curvature may be desirable as it enables the flow conditions to be varied along the tube. For example, it may be desirable for the flow conditions in the tube where it enters the furnace (where the feedstock is relatively cool and has not been cracked) to differ from the flow conditions where the tube exits the furnace (where the feedstock has been cracked and is relatively hot). Using a different curvature will allow the flow conditions to be varied.

A varying curvature also allows the pyrolysis tube portion to perform well across a wide range of flow conditions. Flow conditions may vary, for example based on the type of feedstock, with different types having different densities, viscosities and so forth. It would be possible to optimize the characteristics of the tube portion for a particular set of flow conditions, to achieve the best possible results; however, if the flow conditions were to vary from that particular set, the tube portion may perform sub-optimally. In contrast, if the curvature varies along the length of the tube portion, then it is likely that some region of it will perform well for a given set of flow conditions (even if other regions perform less well), and this should allow the tube portion to be used across a larger range of flow conditions. It is also possible for only part of the pyrolysis tube to have a curved centreline; for example, a "U" shaped pyrolysis tube could have one straight leg and one leg with a centreline curving in three dimensions; with the two legs being joined by a 2D bend.

In certain preferred embodiments, the pyrolysis tube is formed such that is has a portion with a straight centre line and a portion with a centre line which is helical.

Considering the centreline of the tube portion as a helical line, if the helix angle and helix amplitude are constant then the curvature is constant. If on the other hand the curvature is to be varied, then this can be achieved by a variation in the helix angle and/or a variation in the helix amplitude.

Of course, other characteristics of the tube portion, in addition to curvature, may vary along its length. These characteristics include the cross-sectional area of the tube portion, which may be constant or may vary, and its cross-sectional shape. In some embodiments it is preferred that the cross-sectional area increases at some point in the direction of flow, in order to accommodate the expansion effect of heating and the creation of more molecules by the cracking process. Preferably therefore the downstream half of the pyrolysis tube comprises a tube portion of greater cross-sectional area than that of a tube portion of the upstream half of the pyrolysis tube. This may be achieved by providing an expansion piece.

The angle of the helix (or pitch, where the pitch is the length of one turn of the helix, and can be defined in terms of the internal diameter of the tube) is also a relevant factor in influencing the flow. As with relative amplitude, the helix angle may be optimized according to the conditions. The helix angle is preferably less than or equal to 65°, more preferably less than or equal to 55°, 45°, 35°, 25°, 20°, 15°, 10° or 5°.

Generally speaking, for higher Reynolds numbers the helix angle may be smaller whilst satisfactory swirl flow is achieved, whilst with lower Reynolds numbers a higher helix angle will be required to produce satisfactory swirl. In the case of a lower amplitude helix, the use of higher helix angles for faster flows (with higher Reynolds numbers) will generally be undesirable, as there may be near wall pockets of stagnant fluid. Therefore, for a given Reynolds number (or range of Reynolds numbers), the helix angle will preferably be chosen to be as low as possible to produce satisfactory swirl. In certain embodiments, the helix angle is less than 20°.

The helical pyrolysis tube portion may be regarded as being contained in an imaginary envelope which extends longitudinally and has a width equal to the swept width of the helical tube portion. The envelope may be regarded as having a central longitudinal axis, which may also be referred to as an axis of helical rotation. The feature of the amplitude of the helical centre line being equal to or smaller than the internal diameter of the pyrolysis tube portion, in addition to achieving a manageable pressure drop, is beneficial for reasons of compactness, i.e. the swept width is not excessively large.

In certain preferred embodiments, the amplitude of the helical centre line is greater than or equal to one half of the internal diameter of the pyrolysis tube portion. Thus, in these embodiments the helical amplitude is less than or equal to the internal diameter of the pyrolysis tube portion in accordance with the first aspect of the invention, and is greater than or equal to one half of the internal diameter in accordance with this preferred feature. In some embodiments, the helical amplitude is greater than one half of the internal diameter. At these higher ranges of amplitude values, good mixing of the process gases is obtained, with the advantages discussed of minimising back reaction, and although the higher range of amplitudes will tend to increase the amount of pressure drop, this is generally acceptable providing the helix angle is not too high. It is therefore preferred for the embodiments in which the helical amplitude is between half and one internal diameter of the tube, that the helix angle of the helical centre line is less than or equal to 20°. Helix angles of less than 15° or 10° or 5° may be preferable in certain circumstances. In some embodiments, the helix angle may be in the range of 5° to 20° or 5° to 15° or 5° to 10°, or 10° to 15° or 10° to 20°, or 15° to 20°.

In certain preferred forms, the tube portion is formed as a low-amplitude helix. By "low-amplitude helix", we mean that the portion is formed such that its centreline follows a substantially helical path, and that the amplitude of the helix is equal to or less than one half of the internal diameter of the section.

A tube formed as a low-amplitude helix in this manner is advantageous because it provides the advantages of swirl flow but does not take up a much greater volume than a straight tube, and so can easily be used in place of a straight tube. This is particularly helpful if the tubes are to be used in the refitting of an existing furnace, as the straight tubes can simply be replaced with low-amplitude helical tubes.

In a low amplitude helical section of this type, where the amplitude of the helix is less than one half of the internal diameter of the tube, there is a "line of sight" along the lumen of the tube. Even though the flow at the line of sight could potentially follow a straight path, it has been found that it generally has a swirl component.

The "relative amplitude" of the helical portion is defined as the amplitude divided by the internal diameter. If the amplitude of the helical tube is less than or equal to one half of the internal diameter of the tube, this means that the relative amplitude is less than or equal to 0.5. Relative amplitudes less than or equal to 0.45, 0.40, 0.35, 0.30, 0.25, 0.20, 0.15, 0.1 or 0.05 may be preferred. Smaller relative amplitudes provide a better use of available lateral space, in that the tube is not much wider overall than a normal straight tube with the same cross-sectional area. Smaller relative amplitudes also result in a wider "line of sight", providing more space for the insertion of equipment along the tube (which may be useful when cleaning the tube). However, very small relative amplitudes can in some circumstances lead to reduced secondary motion and mixing.

With higher Reynolds numbers, smaller relative amplitudes may be used whilst swirl flow is induced to a satisfactory extent. This will generally mean that, for a given internal diameter, where there is a high flow rate a low relative amplitude can be used whilst still being sufficient to induce swirl flow.

In some preferred embodiments the pyrolysis tube is supported, either by being fixed or by being guided, where it enters the furnace and where it is exits the furnace and is otherwise unsupported. This will normally be the case for example for pyrolysis tubes which extend generally vertically in a furnace, whether with a single pass from top to bottom or bottom to top. Certain straight through or single pass tubes may be fixed at the bottom end and only guided at the top where they connect directly to a quench exchanger. U-coils may be supported at the top and bottom only, or may additionally have an intermediate support at the "U"-bend. "M"-coils or "W"-coils may be supported at the inlet and outlet with supports also being provided at intermediate points.

In some preferred embodiments the pyrolysis tube may extend generally horizontally. In these arrangements, the tube may be supported at its inlet and outlet ends and also at one or more intermediate points during its passage through the furnace.

The pyrolysis tube is preferably exposed directly to the heat of the furnace, i.e. it will not be contained in a housing which is itself disposed in the furnace.

In certain preferred embodiments, the pyrolysis tube may be supported offset from the central longitudinal axis of the imaginary envelope which extends longitudinally and has a width equal to the swept width of the helical tube portion. This may simplify manufacture of the pyrolysis tube. Preferably, however, the pyrolysis tube further comprises a transitional portion longitudinally adjacent to the helical tube portion, the centreline of the flow passage in the transitional tube portion being substantially aligned with the helical centreline of the helical tube portion at a first end of the transitional tube portion adjacent to the helical tube portion, and the centreline of the flow passage in the transitional tube portion being substantially aligned with the central longitudinal axis of the envelope of the helical tube portion at a second end of the transitional tube portion remote from the helical tube portion.

Such a preferred arrangement means that the helical centre line can be brought closer to the central longitudinal axis of the envelope of the helical tube portion. This can reduce any offset from the central longitudinal axis. There are a number of advantages. First, there is a process advantage in that gases flowing into the helical tube portion can pass through a transitional zone in the transitional tube portion, thereby avoiding a sudden change from flow in a straight tube portion to flow in the helical tube portion This management of the flow can contribute to avoiding undesirable pressure drops. Similarly, at the downstream end of a helical tube portion there may be a transitional zone in a transitional tube portion to a straight tube portion.

A second advantage of providing a transitional tube portion relates to the structure of the pyrolysis tube. If for example a pyrolysis tube is supported at its inlet in a position offset from the central longitudinal axis, the weight of the pyrolysis tube will cause a bending moment at the support. By the use of a transitional tube portion in which the centreline of the flow passage substantially aligns with the central longitudinal axis of the envelope of the helical tube portion, the bending moment may be correspondingly reduced.

A third advantage of the use of a transitional tube portion, particularly at the inlet or outlet to the furnace, is that the envelope occupied by the pyrolysis tube, i.e. the space in the furnace, can be generally closer to that of a conventional tube. Thus, where the pyrolysis tube of the invention is to be used to replace an existing pyrolysis tube in a refit, the use of a transitional tube portion can make the refit easier and more practicable.

The transitional tube may be formed such that its centreline curves in various ways to achieve the required alignment at each end. In certain preferred embodiments the centreline of the flow passage in the transitional tube portion follows a helical path, and the amplitude of the helical centreline in the transitional tube portion reduces in a direction away from the helical tube portion to substantially zero so as to bring the centreline of the flow passage in the transitional tube portion substantially into alignment with the central longitudinal axis.

It will be appreciated that the advantages mentioned above in relation to the use of a transitional tube portion are particularly achieved in these preferred arrangements in which the transitional tube has a helical centre line of reducing amplitude.

A transitional tube portion may be provided at an inlet end of the pyrolysis tube. A transitional tube portion may be provided at an outlet end of the pyrolysis tube. Preferably, a first transitional tube portion is provided at an inlet end of the pyrolysis tube and a second transitional tube portion is provided at an outlet end of the pyrolysis tube.

As discussed above, the pyrolysis tube may be helical over only part of its passage through the furnace. In certain preferred embodiments, the flow passage has a centreline which is helical over at least part of the extent of the pyrolysis tube extending in the furnace, wherein a downstream half of said extent of pyrolysis tube extending in the furnace comprises a greater amount of helical passage than an upstream half of said extent of pyrolysis tube.

The inventors have recognised that because the use of a helical tube portion tends to lead to a pressure drop greater than that obtained from a straight tube portion, it may be preferred to select the downstream half of the length of the pyrolysis tube as the best place to use a helical passage. The inventors have realised that the high temperature gradient across the tube wall in the first half of the pyrolysis tube, between the high temperature in the furnace and the process gases in the tube, is effective in raising the temperature of the process gases without the need for the mixing promoted by a helical tube portion. In the downstream half of the pyrolysis tube, where the gases have been brought up substantially to the required reaction temperature, it is desirable to maximise mixing with the water vapour used as a diluent in the process and so minimise back reaction. Hence, the use of a greater amount of helical passage in the downstream half of the length of the pyrolysis tube compared to the upstream half is preferred.

The reference to the extent of the pyrolysis tube extending in the furnace is intended to mean the longitudinal extent of the envelope containing the pyrolysis tube in the furnace. Where the pyrolysis tube is helical, the envelope is the imaginary envelope extending longitudinally and having a swept width equal to the swept width of the helical tube portion. Where the pyrolysis tube is non-helical (i.e. straight or curving in two-dimensions e.g. at a “U”-bend), then the envelope is defined by the outer surface of the pyrolysis tube. Thus the upstream half of the extent of the pyrolysis tube corresponds to the upstream half of the length of the envelope, whilst the downstream half of the extent of the pyrolysis tube corresponds to the downstream half of the length of the envelope.

The reference to the “amount of helical passage” in any given half of the extent of the pyrolysis tube is intended to refer to an amount as measured by the length of the path of the helical centreline of the passage (rather than a length of a straight line between two end points of the helical passage).

The upstream half of the pyrolysis tube may comprise one or more helical tube portions, but to a lesser extent than in the downstream half. In some processes, it may be desired to promote mixing at some point in the upstream half of the pyrolysis tube, so this half may comprise one or more helical tube portions, but to a lesser extent than in the downstream half. Preferably at least 30% of the upstream half of the pyrolysis tube portion comprises a non-helical (for example straight) passage, more preferably 40 or 50 or 60 or 70 or 80%. For some embodiments, the entire upstream half (i.e. 100%) of the pyrolysis tube may comprise a non-helical passage. By “non-helical passage” it is meant that the centre line of the passage may be straight or it may curve in two dimensions.

The downstream half of the pyrolysis tube may comprise one or more non-helical tube portions, but to a lesser extent than in the upstream half. Again there should be more helical passage in the downstream half than in the upstream half. Preferably at least 30% of the downstream half of the pyrolysis tube comprises a helical passage, more preferably 40 or 50 or 60 or 70 or 80 or 90%. In certain embodiments, the entire downstream half (i.e. 100%) of the pyrolysis tube comprises a helical passage.

In a preferred embodiment the pyrolysis tube is “U” shaped, wherein said upstream half of the pyrolysis tube comprises a first leg of the “U” in which the tube defines a flow passage with a substantially straight centreline, and wherein said downstream half of the pyrolysis tube portion comprises a second leg of the "U" in which the tube defines a flow passage with a helical centreline. At the outlet of the second leg there is preferably a straight portion, more preferably with a transitional portion between the helical portion and the straight portion.

In other embodiments the pyrolysis tube is "M" or "W" shaped. In these cases, the upstream half will normally be the first two legs of the "M" or "W" respectively, and the downstream half the second two legs of the "M" or "W" respectively. In other embodiments, the pyrolysis tube may have just a single pass through the furnace, for example from top to bottom or bottom to top, and the single pass can then be considered as being divided into upstream and downstream halves, even though there may be no identifying feature such as a bend or join at the halfway point.

In preferred embodiments of the invention, the pyrolysis tube consists of a single flow passage from the inlet to the outlet. Preferably, there is no splitting of the flow passage by baffles. Preferably there are no "Y" junctions where the flow is split into plural passages or brought together from plural passages to one passage.

Certain preferred embodiments of the invention will now be described by way of example only and with reference to the accompanying drawings, in which.

Figure 1:
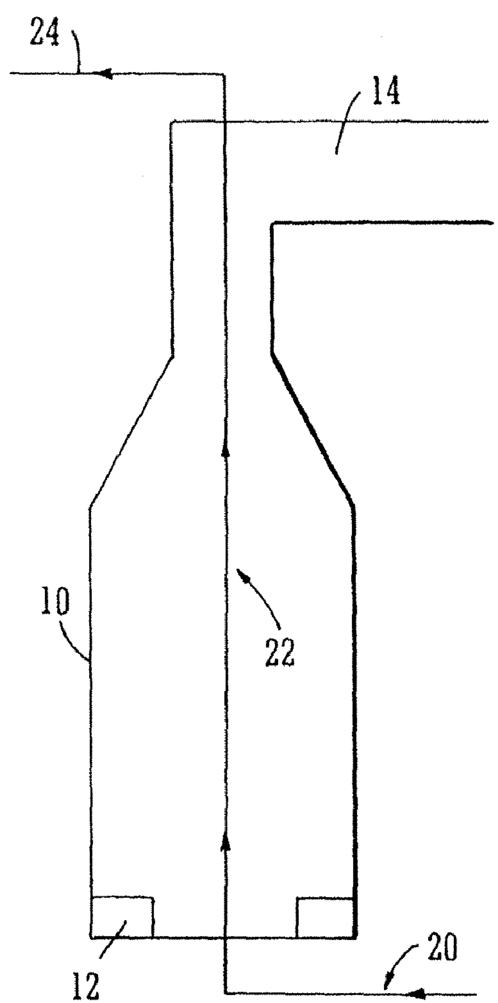
FIG. 1 is a schematic cross-sectional view of a prior art cracking furnace.

In FIG. 1, a prior art cracking furnace is indicated by the reference numeral 10. Burners 12 are disposed at the bottom of the furnace to heat it. Hot combustion products leave the furnace via chimney 14, and these may be used to preheat the feedstock and the steam used in the pyrolysis reaction.

A pyrolysis tube enters the furnace at its base (as indicated by reference numeral 20). The pyrolysis tube extends upwardly through the furnace (reference numeral 22), and in this part of the tube, the pyrolysis reaction takes place. The tube exits the furnace (reference numeral 24), and carries the products of the pyrolysis reaction and any unreacted feedstock to a quench apparatus.

The tube is formed as a generally straight pipe. The bends in the tube are simple planar elbow bends, where the centreline of the pipe curves in two dimensions only.

In practice, there will be a large number of pyrolysis tubes passing through the furnace; however, only a single tube has been shown for clarity purposes.

In some prior art arrangements the pyrolysis has a "U" or "M" or "W" configuration inside the furnace, and are known as U-coils, M-coils or W-coils. In all cases the bends forming the "U" or "M" or "W" shape are in a single plane.

Figure 2:
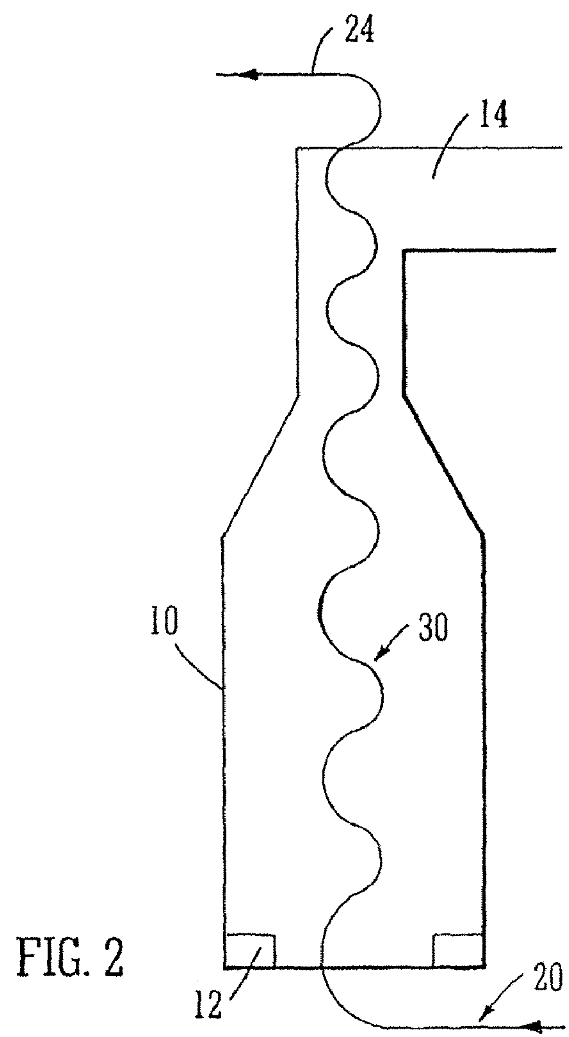
FIG. 2 is a schematic cross-sectional view of a cracking furnace according to a first embodiment of the invention.

FIG. 2 shows a similar furnace, with parts corresponding to those of the furnace of FIG. 1 having the same reference numerals. Again, only a single tube is shown for clarity purposes.

Here, the pyrolysis tube 30 is formed with a centreline curving in three dimensions. In particular, it is formed as a helix with a vertical axis extending from the bottom to the top of the furnace. (As the helix of the pyrolysis tube is shown in side view, it appears as a sine-wave shape.)

It will be appreciated that this is a schematic view, and that the pyrolysis tube may take various forms different from that shown in the Figure.

Because the pyrolysis tube 30 is formed with a centreline curving in three dimensions, the mixture of feedstock and steam in the pyrolysis tube will swirl as it flows along the pyrolysis tube. This will lead to improved mixing of the feedstock and the steam, and will also improve heat transfer from the walls of the pyrolysis tube into and through the mixture. Thus, the walls of the pyrolysis tube can be at a lower temperature than if the flow was not swirling, which allows lower burner fuel consumption. This lower wall temperature will also extend the life of the furnace tube and allow in some instances the use of cheaper alloys and tube manufacturing techniques to be used.

Further, the lower pyrolysis tube wall temperature and the increased near-wall flow velocity both reduce the amount of coke deposited on the walls of the pyrolysis tube, and any coke which is deposited is more likely to be removed from the walls of the tube as a result of the faster flow near the wall.

This reduction in coking is particularly advantageous, as it ensures that good heat transfer characteristics are maintained. It also reduces the need for the furnace to be taken out of action for decoking.

In FIG. 2, the section of the tube before it enters the furnace is shown as being straight; however, this section could also be formed with a centreline which curves in three dimensions, and this section could be helical along its length.

The helical section of the pyrolysis tube 30 in FIG. 2 is shown as being shaped rather like a coil spring. However, this makes the "envelope" of the pyrolysis tube relatively wide, and also considerably increases the length of the tube (and thus the residence time).

These features may be undesirable in some circumstances, and so for some embodiments it is preferred for the helical sections to be formed as a low-amplitude helix, where the tube is formed such that its centreline follows a substantially helical path, and that the amplitude of the helix is equal to or less than one half of the internal diameter of the tube.

Figure 3:
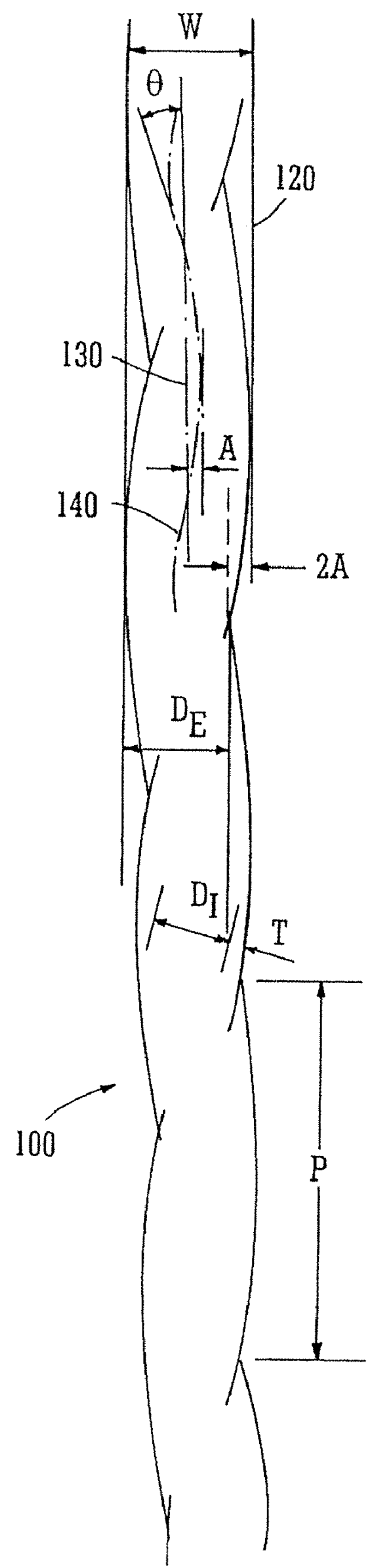
FIG. 3 is a view of a length of tubing having a low-amplitude helical geometry.

A length of tubing having a low-amplitude helical geometry is shown in FIG. 3. This tubing 100 has a circular cross-section, an external diameter $D_E$, an internal diameter $D_I$ and a wall thickness T. The tubing defines a flow passage 11 with a substantially circular cross-section. The tubing is coiled into a helix of constant amplitude A (as measured from mean to extreme), constant pitch P, constant helix angle θ and a swept width W. The tubing 1 is contained in an imaginary envelope 120 which extends longitudinally and has a width equal to the swept width W of the helix. The envelope 120 may be regarded as having a central longitudinal axis 130, which may also be referred to as an axis of helical rotation. The illustrated tubing 1 has a straight axis 130, but it will be appreciated that the central axis may be curved, or indeed may take any shape depending on requirements. The tubing has a centre line 140 which follows a helical path about the central longitudinal axis 130.

It will be seen that the amplitude A is less than half the tubing internal diameter $D_I$. By keeping the amplitude below this size, the lateral space occupied by the tubing and the overall length of the tubing can be kept relatively small, whilst at the same time the helical configuration of the tubing promotes swirl flow of fluid along the tubing. This also provides a relatively wide lumen along the tubing, which allows instruments, apparatus and the like to be passed down the tubing.

Figure 4:
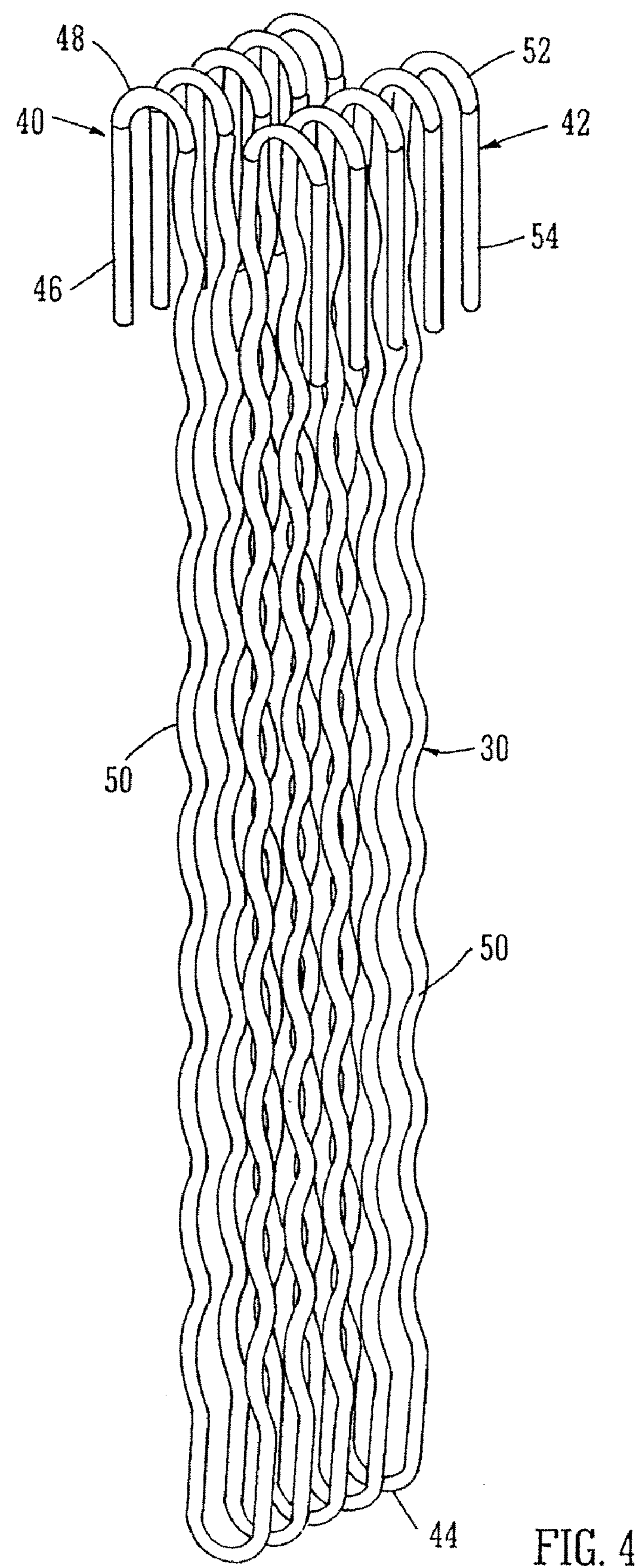
FIG. 4 is a view of a bank of pyrolysis tubes using low-amplitude helical geometry.

FIG. 4 shows a bank of pyrolysis tubes, all formed as low-amplitude helical tubes. It will be appreciated that in practice, the pyrolysis tubes will be formed as a bank in this way, to allow greater throughput with low residence times while still allowing sufficient heat transfer to the feedstock to allow pyrolysis to take place.

The pyrolysis tubes shown in FIG. 4 are of the "U" shaped type. Each tube has an inlet portion 40, an outlet portion 42 and a "U" bend portion 44, curved in two dimensions. The inlet portion 40 has a short section of straight tube 46, followed by a "U" bend section 48, also curved in two dimensions. This feeds into a three dimensionally curved portion 50 which is connected at its downstream end to the "U" bend portion 44. A second three dimensionally curved portion 50 carries the flow to the outlet portion 42, which has a "U" bend section 52 and then a short section of straight tube 54. The two dimensionally curved "U" bend sections 48, 52 and the "U" bend portion 44 are curved in two dimensions for manufacturing and installation convenience and this is not essential.

In a more preferred embodiment the "U" bend sections 48, 52 would not be used as they would add to the pressure drop in the tube. It is preferred that the inlet tube 46 would be horizontal and would connect to the three dimensionally curved portion 50 via an elbow bend, and that the outlet would be vertical i.e. "U" bend section 52 and straight tube 54 would be omitted.

Figure 5A:
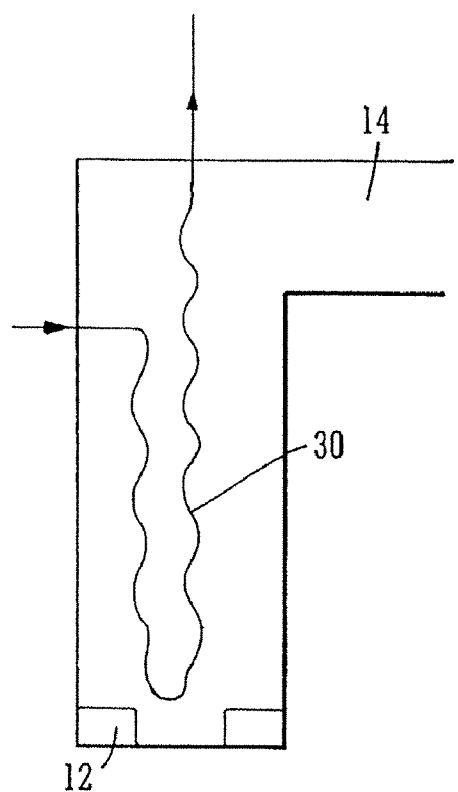
FIGS. 5*a* and 5*b* are schematic cross-sectional views of cracking furnaces using alternative layouts of low-amplitude helical geometry.
Figure 5B:
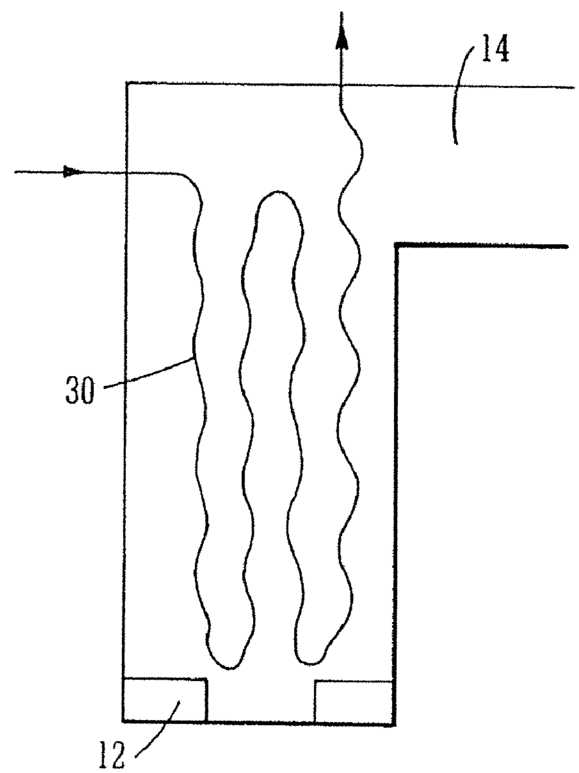

In FIG. 1, the pyrolysis tube enters the furnace at the bottom, and exits at the top. FIGS. 5*a* and 5*b* are schematic views of alternative arrangements of the pyrolysis tubes 30. In each case, the centrelines 140 (as described in relation to FIG. 3) are helical. In FIG. 5*a*, the pyrolysis tube enters towards the top of the furnace, extends downwards to the bottom, curves around, extends to the top of the furnace and exits. The tube is thus generally "U"-shaped. In this case the axis of helical rotation 130 (or the central longitudinal axis 130 of the envelope 120) described in relation to FIG. 3 would be "U"-shaped.

In FIG. 5*b*, rather than exiting immediately at the top of the furnace, the tube 30 makes another down-and-up loop, and exits at the top of the furnace. The tube is thus generally "W"-shaped. In this case the axis of helical rotation 130 described in relation to FIG. 3 would be "W"-shaped. Of course, the particular arrangement of the tube will depend on the specific requirements, and it will be appreciated that other shapes of pyrolysis tube, and other points of entry into and exit from the furnace, can be used depending on the particular requirements.

Figure 6:
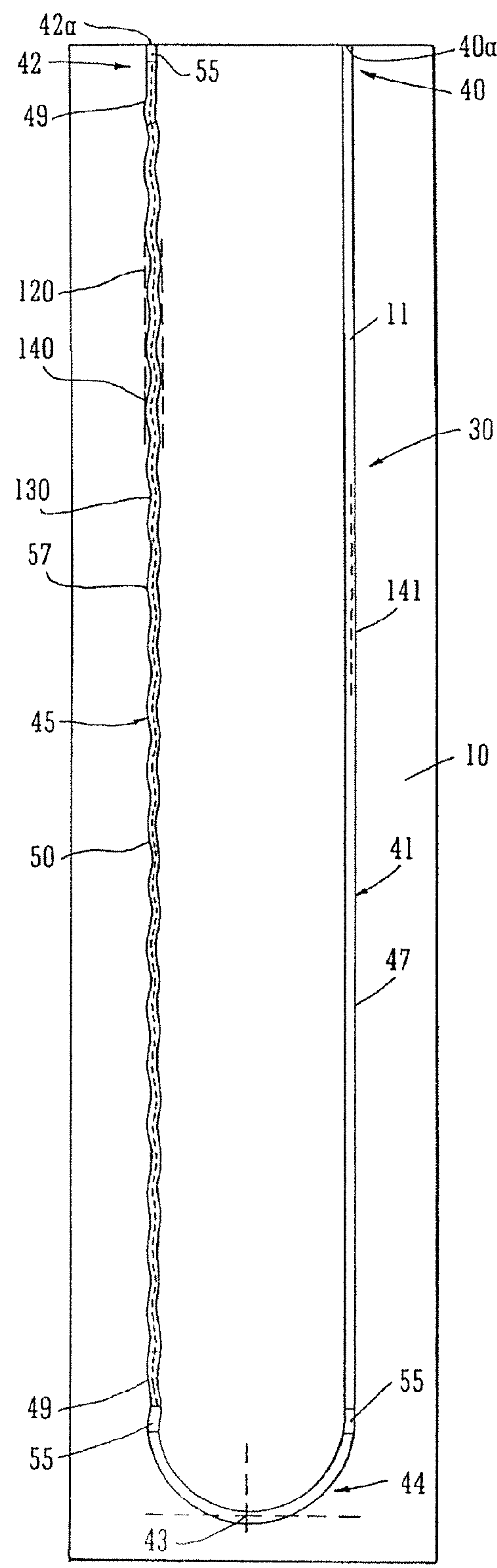
FIGS. 6, 7 and 8 are schematic cross-sectional views of cracking furnaces with pyrolysis tubes.

The pyrolysis tube 30 shown in FIG. 6 is generally U-shaped, having an inlet portion 40, an outlet portion 42 and a "U" bend portion 44. The pyrolysis tube defines a flow passage 11 with a circular cross-section. The pyrolysis tube 30 extends in the furnace 10 from an inlet 40*a* to an outlet 42*a*. An upstream half 41 of the pyrolysis tube may be considered as that part of the tube which extends from the inlet 40*a* to the mid-point of the "U" bend portion 44, the mid-point being shown as 43. The downstream half 45 of the pyrolysis tube may be considered as that part of the pyrolysis tube extending from the mid-point 43 of the "U" bend portion 44 to the outlet 42*a*. The length of the central longitudinal axis 130 of the envelope 120 is the same for the upstream half of the pyrolysis tube as for the downstream half. It will be appreciated that where the tube is non-helical the envelope corresponds to the outer surface 57 of the pyrolysis tube.

The upstream half 41 of the pyrolysis tube includes a generally straight section 47 with a straight centreline 141. This means that the central longitudinal axis of the envelope containing the pyrolysis tube is coincident with the straight centreline 141 of the circular cross-section flow passage 11 defined by the tube. The downstream half 45 of the pyrolysis tube includes a helical portion 50, i.e. a portion in which the tube and the flow passage which it defines have a helical centreline 140. Between the "U" bend portion 44 and the helical portion 50 there is provided a transitional portion 49, described later in more detail. A transitional portion 49 is also provided between the curved portion 50 and a straight portion 55 forming part of the outlet portion 42.

In use, feedstock and steam enter the furnace 10 at tie inlet 40*a* and are heated up as they progress along the straight section 47 of the upstream half 41 of the pyrolysis tube. In this upstream portion there is a large difference in temperature between the process gases and the furnace and so rapid heating of the process gases is achieved in a conventional manner. Because the pyrolysis tube in the upstream half is generally straight, pressure losses are within normal and acceptable limits. After the process gases have passed around the "U" bend portion 44 they enter the transitional portion 49 and there is a transition of the flow as it exits the "U" bend in to a swirling flow. Typically at this point the process gases have reached reaction temperature and cracking of the larger hydrocarbon molecules is taking place. Once the flow is swirling there is substantial mixing of the water vapour molecules with the molecules which are the product of the reactions. This mixing serves to minimise back reaction and hence the helical portion 50 serves to increase the yield of the cracking process.

Figure 7:
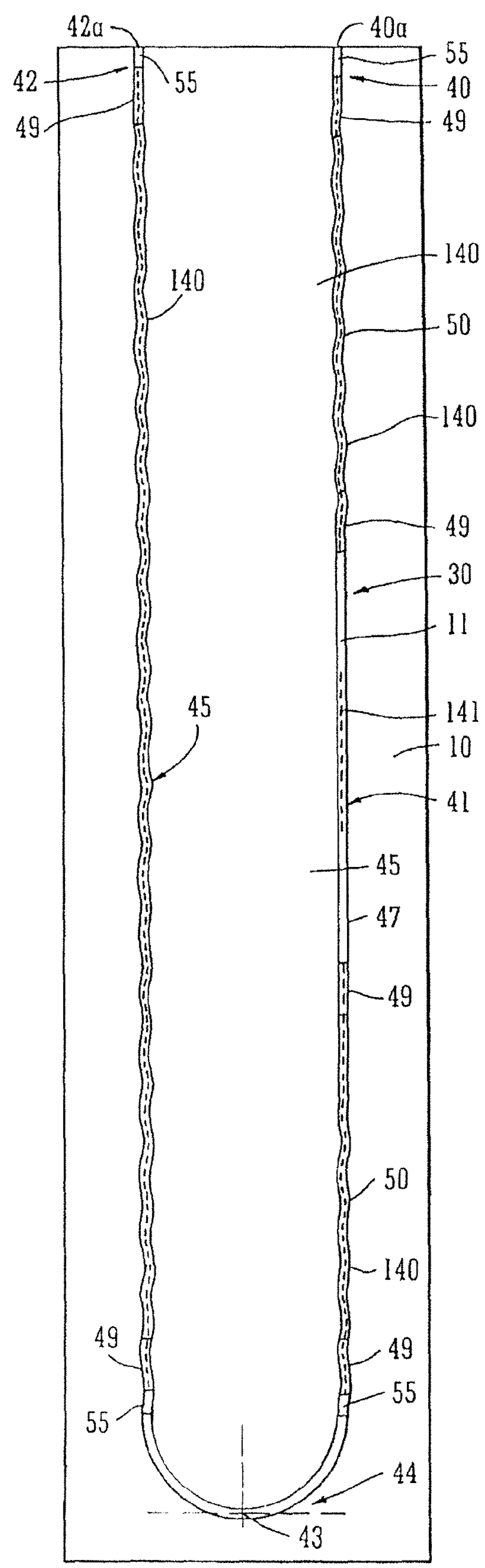

FIG. 7 shows a furnace 10 with a different configuration of pyrolysis tube 30. In this case the upstream half 41 of the pyrolysis tube includes two helical portions 50, as well as a straight section 47 between the helical portions 50. The straight section 47 is connected at each end to the respective helical portion 50 via a transitional portion 49. The downstream half 45 of the pyrolysis tube has a helical portion 50 which extends from the "U" bend portion 44 to the outlet portion 42. Thus the downstream half 45 of the pyrolysis tube comprises a greater amount of helical passage than the upstream half 41.

In use, the helical portions 50 provided in the upstream half serve to generate swirl flow, resulting in cross-mixing and hence a more rapid transfer of heat from the furnace across the tube wall to the process gases. However, since in this upstream half 41 the temperature gradient across the tube wall is large, it is not necessary to provide a helical passage along the whole length of the upstream half. By using a reduced amount of helical passage, the pressure drop caused by the use of a helical passage in the upstream half can be reduced.

Figure 8:
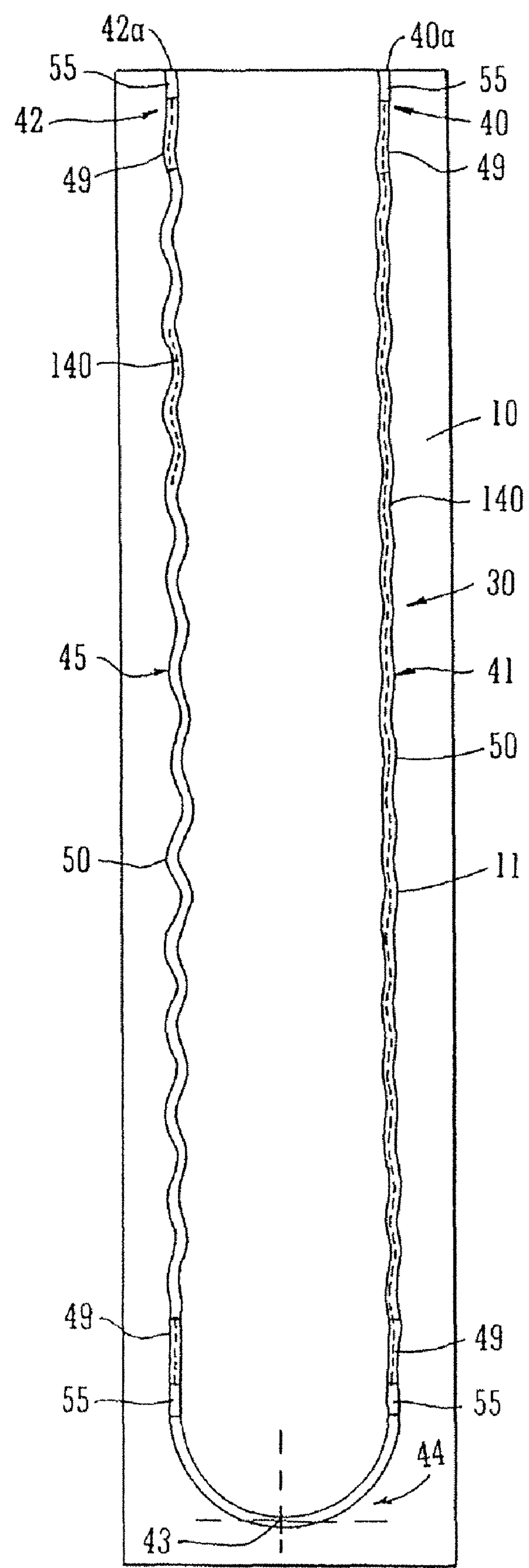

FIG. 8 shows another embodiment of a generally "U" shaped pyrolysis tube. In this case the upstream half 41 of the tube has a helical portion 50 extending from the inlet portion 40 to the "U" bend portion 44 (with appropriate transitional portions 49 provided between the non-helical and the helical portions). In the downstream half 45 of the pyrolysis tube a downstream helical portion 50 extends from the "U" bend portion 44 to the outlet portion 42, again with transitional portions 49 being provided between the non-helical and helical portions. In the example shown, the upstream helical portion 50 and the downstream helical portion 50 have the same pitch as each other, but the amplitude of the upstream helical portion 50 is smaller than that of the downstream helical portion 50. Thus the length of the helical centreline 140 in the downstream helical portion 50 is greater than the length of the helical centreline in the upstream helical portion 50. There is therefore a greater amount of the helical passage in the downstream half of the length of the pyrolysis tube than in the upstream half of the length of the pyrolysis tube. However other variants are possible.

In use of the furnace of FIG. 8, the upstream helical portion 50 serves to induce swirl flow in the process gases. This results in cross-mixing in the flow and improved heat transfer. However, since in this upstream half 41 the temperature gradient across the tube wall is large, the amplitude of the helix can be relatively low. When the process gases pass through the downstream helical portion 50 swirl flow is induced and because of the greater helical amplitude there is an increased level of cross-mixing. A major benefit of the cross-mixing in the downstream half of the pyrolysis tube is that molecules which are the product of the cracking process are well mixed with the diluent water vapour molecules and so the tendency for back reaction is minimised. The greater helical amplitude in the downstream helical portion 50 provides this benefit, whilst the use of a smaller helical amplitude in the upstream helical portion 50 reduces the pressure loss which would incur in the case of a larger helical amplitude.

Figure 9:
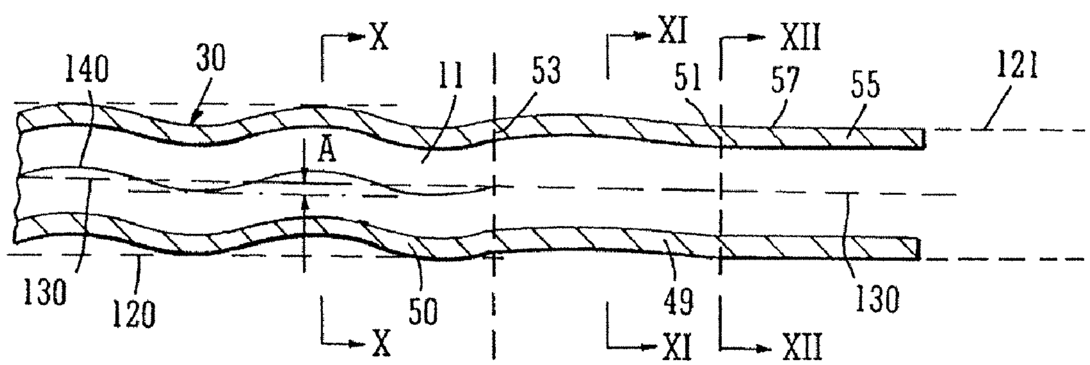
FIG. 9 is a longitudinal a cross-sectional view of the end of a helical tube portion where it joins a transitional tube portion.

FIG. 9 shows the region where a helical tube portion 50 joins with a non-helical tube portion 55. The helical portion 50 defines a helical flow passage 11 and is itself contained in an imaginary envelope 120 having a central longitudinal axis 130. The helical tubing portion 50 and the flow passage 11 which it defines have a helical centreline 140 following a helical path about the central longitudinal axis 130. The helical centreline has a helical amplitude A.

A transitional portion 49 of the pyrolysis tube is located axially adjacent to the helical portion 50, being either integrally formed with helical portion 50 or butt welded thereto. In the transitional portion 49 the amplitude reduces towards an end 51 remote from helical portion 50. At the end 53 of the transitional portion 49 which adjoins helical portion 50 the amplitude of the helical centreline of the transitional portion 49 is the same as the amplitude A in the helical portion 50. At the remote end 51 the amplitude has reduced to zero.

A non-helical or straight portion 55 of the pyrolysis tube is located axially adjacent to the transitional portion 49. The central axis 130 of this straight tube portion 55 is the same as the central axis 130 of envelope 120. The envelope 121 of straight portion 55 is defined by the outer surface 57 of the pyrolysis tube, and for explanation purposes this envelope is shown extended at dotted lines 121.

Figure 10:
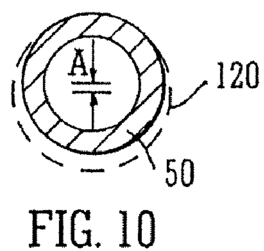
FIGS. 10, 11 and 12 are respective cross-sections on the lines X-X, XI-XI and XII-XII of FIG. 9.
Figure 11:
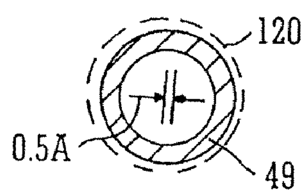
Figure 12:
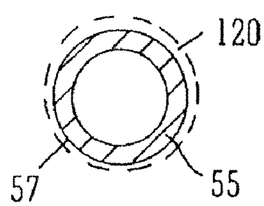

FIGS. 10, 11 and 12 show transverse cross-sections through the pyrolysis tube 30 of FIG. 9. In FIG. 10, it can be seen that the amplitude of the helical centreline 140 is A, whilst in FIG. 11, halfway along the axial length of the transitional portion 49 the amplitude has reduced to 0.5 A At the end 51 of the transitional portion 49 the amplitude has reduced to zero.

The arrangement of FIGS. 9-12 can be used at the inlet to or outlet from a furnace, for example at the outlet 42 of the pyrolysis tube shown in FIG. 6, at the inlet 40 and/or the outlet 42 of the pyrolysis tube shown in FIG. 7, and at the inlet 40 and/or the outlet 42 of the pyrolysis tube shown in FIG. 8. In each case the helical centreline 140 of the helical portion continues into the transitional portion 49 where the amplitude of the helical centreline reduces to zero and so comes into alignment with the central longitudinal axis 130 of the envelope 120 of the helical portion 50. The helical portion is therefore supported at the inlet and/or outlet of the furnace symmetrically with respect to the central longitudinal axis, thereby avoiding or minimising a bending moment at the support which would otherwise be caused by an offset supporting arrangement. In addition the flow into or out of the helical portion 50 can undergo a progressive transition in the transitional portion 49. Further, if the pyrolysis tube is being used as a replacement for a conventional tube not having helical portions, the centring effect of the transitional tube portion 49 ensures that the replacement tube will have its central longitudinal axis in the same position as the central axis of the (usually straight) tube portion which it replaces. Therefore where, as is usual, multiple tubes are being replaced, the new tubes should fit properly into place.

The invention claimed is:

1. A cracking furnace comprising at least one pyrolysis tube passing through the furnace, the pyrolysis tube defining a flow passage with a cross-section which is substantially circular, wherein the pyrolysis tube is formed such that the flow passage of substantially circular cross-section has at least one portion whose centreline curves in three dimensions so as to be helical, and wherein the amplitude of the helical centreline is less than or equal to the internal diameter of the tube portion, wherein the pyrolysis tube extends generally horizontally.

2. A cracking furnace comprising at least one pyrolysis tube passing through the furnace, the pyrolysis tube defining a flow passage with a cross-section which is substantially circular, wherein the pyrolysis tube is formed such that the flow passage of substantially circular cross-section has at least one portion whose centreline curves in three dimensions so as to be helical, and wherein the amplitude of the helical centreline is less than or equal to the internal diameter of the tube portion, wherein the flow passage has a centreline which is helical over at least part of the extent of the pyrolysis tube extending in the furnace, wherein a downstream half of said extent of pyrolysis tube extending in the furnace comprises a greater amount of helical passage than an upstream half of said extent of pyrolysis tube.

3. A cracking furnace comprising at least one pyrolysis tube passing through the furnace, the pyrolysis tube defining a flow passage with a cross-section which is substantially circular, wherein the pyrolysis tube is formed such that the flow passage of substantially circular cross-section has at least one portion whose centreline curves in three dimensions so as to be helical, and wherein the amplitude of the helical centreline is less than or equal to the internal diameter of the tube portion, wherein the helical tube portion is contained in an imaginary envelope which extends longitudinally and has a width equal to the swept width of the helical tube portion, the envelope having a central longitudinal axis, and wherein the pyrolysis tube further comprises a transitional portion longitudinally adjacent to the helical tube portion, the centreline of the flow passage in the transitional tube portion being substantially aligned with the helical centreline of the helical tube portion at a first end of the transitional tube portion adjacent to the helical tube portion, and the centreline of the flow passage in the transitional tube portion being substantially aligned with the central longitudinal axis of the envelope of the helical tube portion at a second end of the transitional tube portion remote from the helical tube portion.

4. A cracking furnace as claimed in claim 3, wherein the centreline of the flow passage in the transitional tube portion follows a helical path, and wherein the amplitude of the helical centreline in the transitional tube portion reduces in a direction away from the helical tube portion to substantially zero so as to bring the centreline of the flow passage in the transitional tube portion substantially into alignment with the central longitudinal axis.

5. A cracking furnace as claimed in claim 3, wherein the transitional tube portion is provided at an inlet end of the pyrolysis tube.

6. A cracking furnace as claimed in claim 3, wherein the transitional tube portion is provided at an outlet end of the pyrolysis tube.

7. A cracking furnace as claimed in claim 3, wherein a first transitional tube portion is provided at an inlet end of the pyrolysis tube and a second transitional tube portion is provided at an outlet end of the pyrolysis tube.

* * * * *